Jan. 21, 1964   J. O. PILCHER II, ET AL   3,118,333
CHAFF CUTTING PROCESS
Filed June 27, 1962
Fig. 1.
Fig. 2.
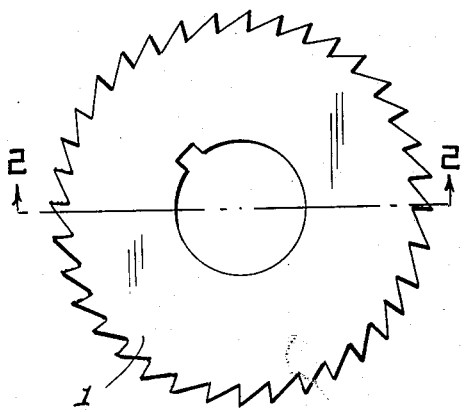
Fig. 4.
Fig. 3.
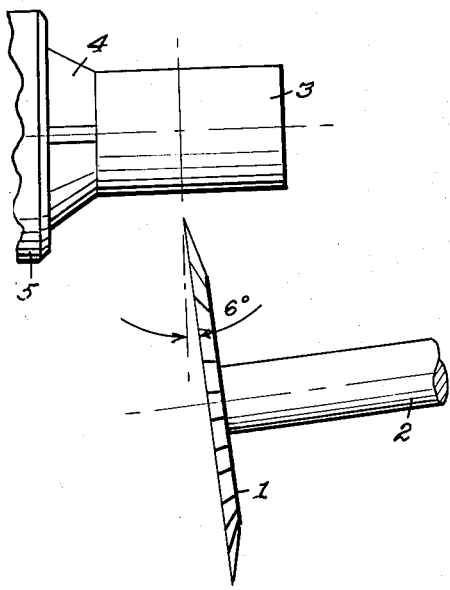
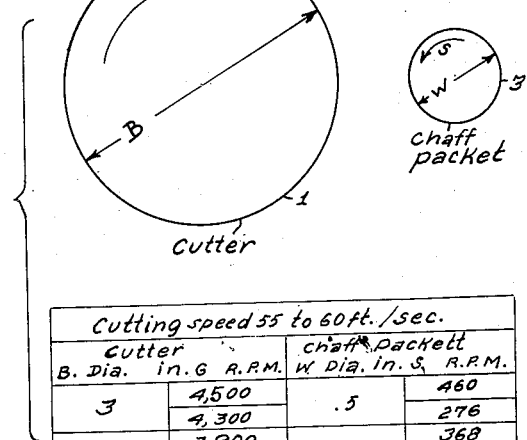
| Cutting speed 55 to 60 ft./sec. | | | |
|---|---|---|---|
| Cutter | | Chaff packett | |
| B. Dia. | in. G R.P.M. | W Dia. in. S | R.P.M. |
| 3 | 4,500 | .5 | 460 |
|   | 4,300 |    | 276 |
| 3½ | 3,900 | .625 | 368 |
|    | 3,700 |      | 220 |
| 4 | 3,400 | .750 | 315 |
|   | 3,200 |      | 189 |
| 4½ | 3,000 | .875 | 263 |
|    | 2,900 |      | 158 |
| 5 | 2,700 | 1.000 | 230 |
|   | 2,600 |       | 138 |
| 5½ | 2,500 | 1.125 | 204 |
|    | 2,400 |       | 122 |
| 6 | 2,200 | 1.250 | 184 |
|   | 2,200 |       | 110 |
INVENTOR.
James O. Pilcher, II
BY Lyle G. Kirkendall
J. J. Rotondi & A. F. Dupont

3,118,333
CHAFF CUTTING PROCESS

James O. Pilcher, II, Aberdeen, and Lyle G. Kirkendall, Havre de Grace, Md., assignors to the United States of America as represented by the Secretary of the Army
Filed June 27, 1962, Ser. No. 205,803
1 Claim. (Cl. 82—47)
(Granted under Title 35, U.S. Code (1952), sec. 266)

The invention described herein may be manufactured and used by or for the Government for governmental purposes without the payment to us of any royalty thereon.

This invention relates to a chaff cutting process and more particularly to a process of cutting metalized nylon chaff in such a way that the nylon filaments will not be fused and the lay of the filaments not disturbed.

Metalized nylon chaff consists of aluminized nylon filaments of 2 to 12 mils in diameter and which are packed along parallel axes into paper bound packets, which packets are then cut to desired lengths.

These packets of metalized nylon chaff are dispersed into the air to form reflecting clouds for radio waves, particularly those at radar frequencies.

The time delay experienced in obtaining a specific length of chaff packet made it necessary to devise a method of cutting the chaff packets.

The cutting of the chaff packets must be accomplished in such a way that the nylon filaments will not become fused and the lay of the filaments do not become disturbed. If the chaff becomes fused or entangled, it will not disperse properly upon deployment; thus, its effectiveness as a reflective area is reduced considerably.

It is, therefore, an object of this invention to provide a process for cutting metalized nylon chaff packets accurately, quickly and without causing fusing and entanglement of the filaments.

Other objects and advantages will become apparent from a description of the following embodiment in the accompanying drawings in which:

FIG. 1 illustrates a plan view of a modified slitting saw employed to cut the chaff packets, FIG. 2 is a cross section view of the saw taken along lines 2—2 of FIG. 1, FIG. 3 illustrates a chaff packet mounted in a lathe collet and the cutting saw in operative position, and, FIG. 4 is a cutting speed chart.

The cutting process is a tool-post-grinder type of lathe operation, using a modified 1/16" slitting saw as a parting tool and water drenching for the cooling.

In the drawing, the slitting saw is indicated by reference numeral 1 and is modified by grinding and honing the edge 1a to a 10° angle to the plane of the saw's face, as shown in FIG. 2; the selection of the saw's diameter depending on the diameter of the packet of chaff to be cut and the speed of the cutter saw, to be described later.

As shown in FIG. 3, saw 1 is mounted for driven rotation on a tool post grinder shaft 2, the grinder not being shown and which grinder is mounted on a lathe bed, also not shown.

The flat side of saw 1 is positioned at an angle of 6°±30' to the axis of rotation of the chaff 3 to be cut. The aforesaid angle is critical for efficient cutting and must be maintained during the cutting process to prevent fusing of the filaments.

As seen in FIG. 3, the chaff packet 3 is mounted in a collet 4 which, in turn, is mounted for driven rotation in the head stock 5 of a lathe, a portion of which is shown in this figure. A split bushing may be used instead of a collet if a collet of the correct size is unattainable.

A spout, not shown, is provided to direct a flow of coolant, as clean water, to completely flood the packet 3 during cutting for reducing heat caused by the cutting process.

The cutting speed, which is the relative speed between the chaff packet 3 and the saw 1, is also critical to efficient cutting, and must be maintained at 55 to 60 feet per second.

The chart shown in FIG. 4 indicates several acceptable and convenient combinations of saw or cutter diameters and speeds which will produce the desired cutting speed, however there are innumerable combinations that may be used which will meet the requirements of a relative cutting speed of 55 to 60 feet per second.

The cross feed, which is the rate at which the saw 1 advances through the work on a path perpendicular to the axis of the chaff packet 3, is adjusted so that saw 1 is fed into chaff packet 3 at the rate of one filament diameter per revolution. The feed for a 4 mil filament, for example, is 0.004 inch per revolution.

Three major difficulties are overcome by the present process: (a) fusing of nylon, (b) tangling or pulling of filaments, and (c) excessive wear of the saw.

Fusing is caused by excessive heat that is generated by a dull cutter, improper clearance angle, insufficient coolant, or a combination of the above causes, a dull cutter usually being the cause of fusing.

Tangling or pulling occurs when the cutting action is too slow and the cutter pulls the filaments from the packet, and is caused by too fast a feed or too high a relative cutting speed.

Excessive dulling of the cutter occurs when the relative cutting speed and feed are set too low.

Thus, the stated speeds and angles are critical in overcoming the aforesaid difficulties and for maintaining efficient operation of the process of the invention.

In a previous test, one hundred packets of chaff were cut by the process of the invention. It was found that ten to fifteen 7/8 inch diameter packets could be cut per man hour with a cutting tolerance of plus or minus .005 inch.

The tolerances obtained by this process are comparable with pre-cut chaff.

The chaff-cutting process of the invention is an effective means of shortening the length of chaff packets.

The process described may also be performed on an automatic screw machine, not shown, and a production rate of 60 to 70 pieces per hour can be obtained.

As an alternate to the cutting saw 1, a standard skiving knife with a 10° inclined angle cutting edge (not shown) may be employed.

Other variations and modifications may be effected without departing from the scope of the subjoined claim.

What is claimed is:

A chaff cutting process for cutting a packet of metalized nylon filaments comprising the steps of:
 (a) rotating a chaff packet at a predetermined speed,
 (b) simultaneously rotating and cross-feeding a circular saw having a flat edge on one side thereof, its other edge being beveled to a 10 degree angle with respect thereto, through said rotating chaff packet, said cross-feed rate having a range of 55 to 60 feet per second relative to the rotational speed and diameter of said packet whereby said saw is fed through said packet at a rate of one filament per revolution of said saw, said saw having its axis disposed at an angle of 6 degrees relative to the axis of said chaff packet, and, (c) flooding said packet throughout the cutting process with clean water.

References Cited in the file of this patent

UNITED STATES PATENTS

| | | |
|---|---|---|
| 1,086,606 | Merritt et al. | Feb. 10, 1914 |
| 1,248,330 | Huish | Nov. 27, 1917 |
| 2,109,786 | Taft | Mar. 1, 1938 |
| 2,389,757 | Bickel | Nov. 27, 1945 |
| 2,796,793 | Addison et al. | June 25, 1957 |
| 2,809,333 | Wagner | Oct. 8, 1957 |
| 2,810,187 | Klein | Oct. 22, 1957 |
| 3,008,071 | Karger | Nov. 7, 1961 |

FOREIGN PATENTS

| | | |
|---|---|---|
| 311,884 | Switzerland | Feb. 15, 1956 |